United States Patent [19]
Glynn et al.

[11] Patent Number: 5,949,752
[45] Date of Patent: Sep. 7, 1999

[54] RECORDING MEDIA AND METHODS FOR DISPLAY OF GRAPHIC DATA, TEXT, AND IMAGES

[75] Inventors: Patrick J. Glynn, Archbald; Robert T. Seidel, West Pittston; James Babinski; Jeffrey McDermott, both of Scranton; Tressa Shuta, Olyphant, all of Pa.

[73] Assignee: WEA Manufacturing Inc., Olyphant, Pa.

[21] Appl. No.: 08/961,567

[22] Filed: Oct. 30, 1997

[51] Int. Cl.⁶ ........................................................ G11B 7/24
[52] U.S. Cl. ............................................................. 369/275.3
[58] Field of Search .......................... 369/275.3, 275.4, 369/275.1, 274, 273, 272; 428/64.4, 64.2; 430/321, 320

[56] References Cited

U.S. PATENT DOCUMENTS

| | | | |
|---|---|---|---|
| 3,689,078 | 9/1972 | Ban | 274/42 P |
| 4,066,268 | 1/1978 | Borchard et al. | 274/42 R |
| 4,644,401 | 2/1987 | Gaskins | 358/183 |
| 4,967,286 | 10/1990 | Nomula et al. | 358/342 |
| 5,285,438 | 2/1994 | Marchand et al. | 369/275.3 |
| 5,398,231 | 3/1995 | Shin et al. | 369/275.4 |
| 5,432,900 | 7/1995 | Rhodes et al. | 395/154 |
| 5,608,717 | 3/1997 | Ito et al. | 369/275.3 |
| 5,608,718 | 3/1997 | Schiewe | 369/275.4 |
| 5,675,570 | 10/1997 | Ohira et al. | 369/275.1 |
| 5,726,373 | 3/1998 | Choi et al. | 84/609 |
| 5,748,607 | 5/1998 | Ohira et al. | 369/275.4 |
| 5,751,690 | 5/1998 | Ohira et al. | 369/275.3 |
| 5,781,526 | 7/1998 | Nishizawa et al. | 369/275.3 |

FOREIGN PATENT DOCUMENTS

| | | |
|---|---|---|
| 0 330 732 | 9/1989 | European Pat. Off. . |
| 0 539 146 | 4/1993 | European Pat. Off. . |
| 09034475 | 2/1997 | European Pat. Off. . |
| 03228086 | 10/1991 | Japan . |
| 08265701 | 10/1996 | Japan . |
| 09127965 | 5/1997 | Japan . |

*Primary Examiner*—Tan Dinh
*Attorney, Agent, or Firm*—Fish & Neave; Robert R. Jackson; Douglas A. Cardwell

[57] ABSTRACT

The present invention relates to a recording medium including video, audio and graphics information stored in separate sets of data packets and a method for creating the same. The graphic information can be superimposed on the video information during playback of the recording media. The graphic information can include text or images. The text has a translucent background and the images may be translucent in whole or in part.

16 Claims, 5 Drawing Sheets

5,949,752

RECORDING MEDIA AND METHODS FOR DISPLAY OF GRAPHIC DATA, TEXT, AND IMAGES

BACKGROUND OF THE INVENTION

This invention relates to recording media including video, audio and graphics information stored in separate data packets. The graphic information can be superimposed on the video information during playback of the recording media. The graphic information can include text or images. The text has a translucent background and the images may be translucent in whole or in part.

Examples of such recording media include DVD discs, CD-I discs and CD-V discs. All of these recording media share the common characteristics of being able to store video, audio and graphics information in separate data packets.

Heretofore, such recording media were able to display graphic information that included text. The text included subtitles, usually displayed in white at the bottom of the screen superimposed on top of the video data. In certain cases, the text was provided with a black or darkly contrasting background to improve the readability of the text. However, although improving the readability of the text, the background obscured the video data on which it was superimposed.

Heretofore, such recording media were able to display graphic information that included images. The images, however, were of a solid color, thereby obscuring the video data on which they were superimposed.

In view of the foregoing, it would be desirable to provide a recording medium in which text data can be displayed with improved readability while minimizing any obstruction of the video data on which it is superimposed.

In view of the foregoing, it would be desirable to provide a recording medium in which an image which may be translucent in whole or in part, thereby not obscuring the video data on which it is superimposed.

SUMMARY OF THE INVENTION

It is an object of the present invention to provide a recording medium in which text data can be displayed with improved readability while minimizing any obstruction of the video data on which it is superimposed.

It is a further object of the present invention to provide a recording medium in which an image which may be translucent in whole or in part, thereby not obscuring the video data on which it is superimposed.

These and other objects are accomplished by providing a recording medium which includes a first set of data packets on which video data is recorded, a second set of data packets on which audio data is recorded and a third set of data packets on which graphic data is recorded wherein the graphic data is superimposed on the video data during display. The graphic data includes text with a translucent background and/or an image which may be translucent in whole or in part.

BRIEF DESCRIPTION OF THE DRAWINGS

The above and other objects and advantages of the invention will be apparent upon consideration of the following detailed description, taken in conjunction with the accompanying drawings, in which reference characters refer to like parts throughout and in which.

DETAILED DESCRIPTION OF THE INVENTION

The present invention relates to a recording medium including video, audio and graphics information stored in separate data packets and a method for creating the same. The graphic information can be superimposed on the video information during playback of the recording media. The graphic information can include text or images. The text can have a translucent background and the images may be translucent in whole or in part.

Figure 1:
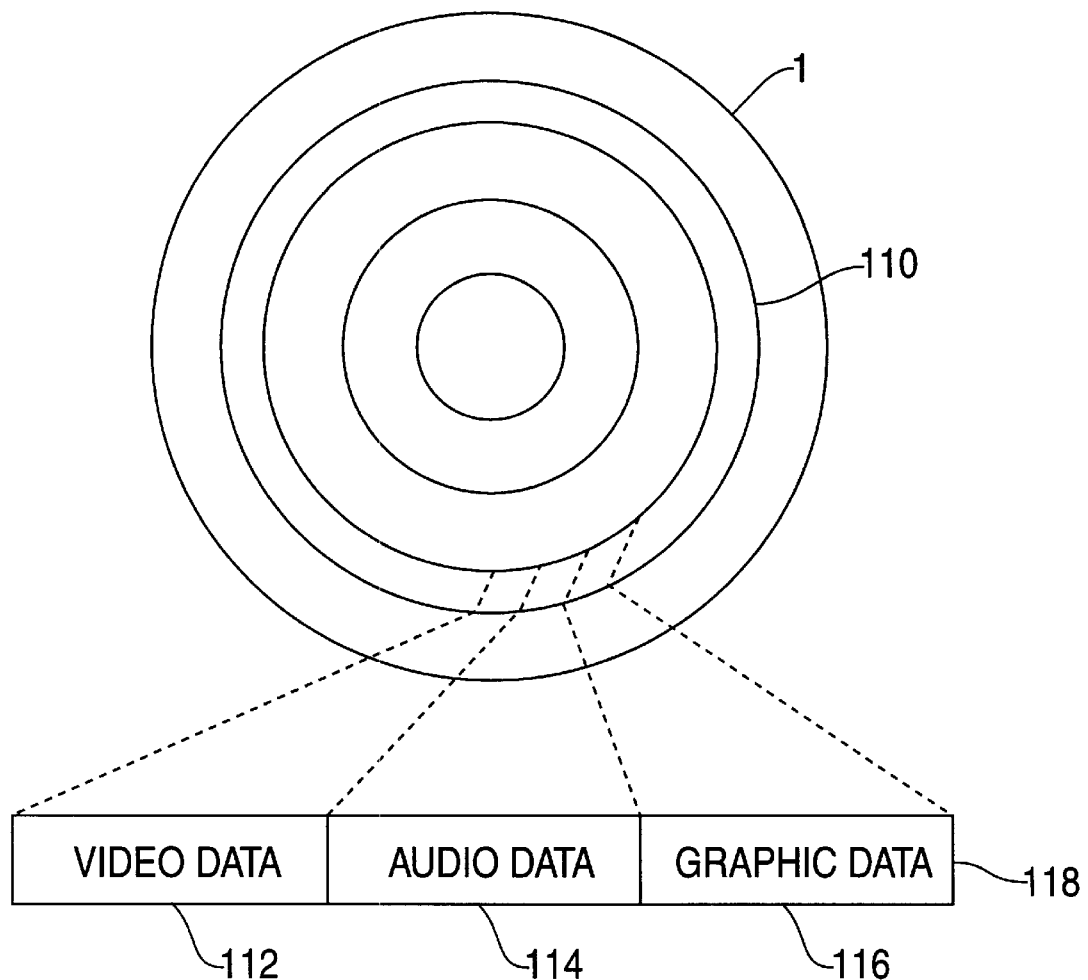
FIG. 1 shows a typical recording medium.

FIG. 1 shows a typical recording medium 1 such as a DVD disc, a CD-I disc or a CD-V disc. All of these recording media share the common characteristics of being able to store video, audio and graphics information in separate data packets 110 on the recording medium 1. Video data is stored in video data packets 112. Audio data is stored in audio data packets 113. Graphic data is stored in graphic data packets 116. The data packets 110 are segmented into a plurality of frames 118. Each frame 118 comprises video data, audio data and graphic data for reproduction during a set interval of time. Typically, the set interval of time is selected to correspond to the standard frame rates (i.e., one frame every $\frac{1}{24}$ second, $\frac{1}{25}$ second or $\frac{1}{30}$ second).

Figure 2:
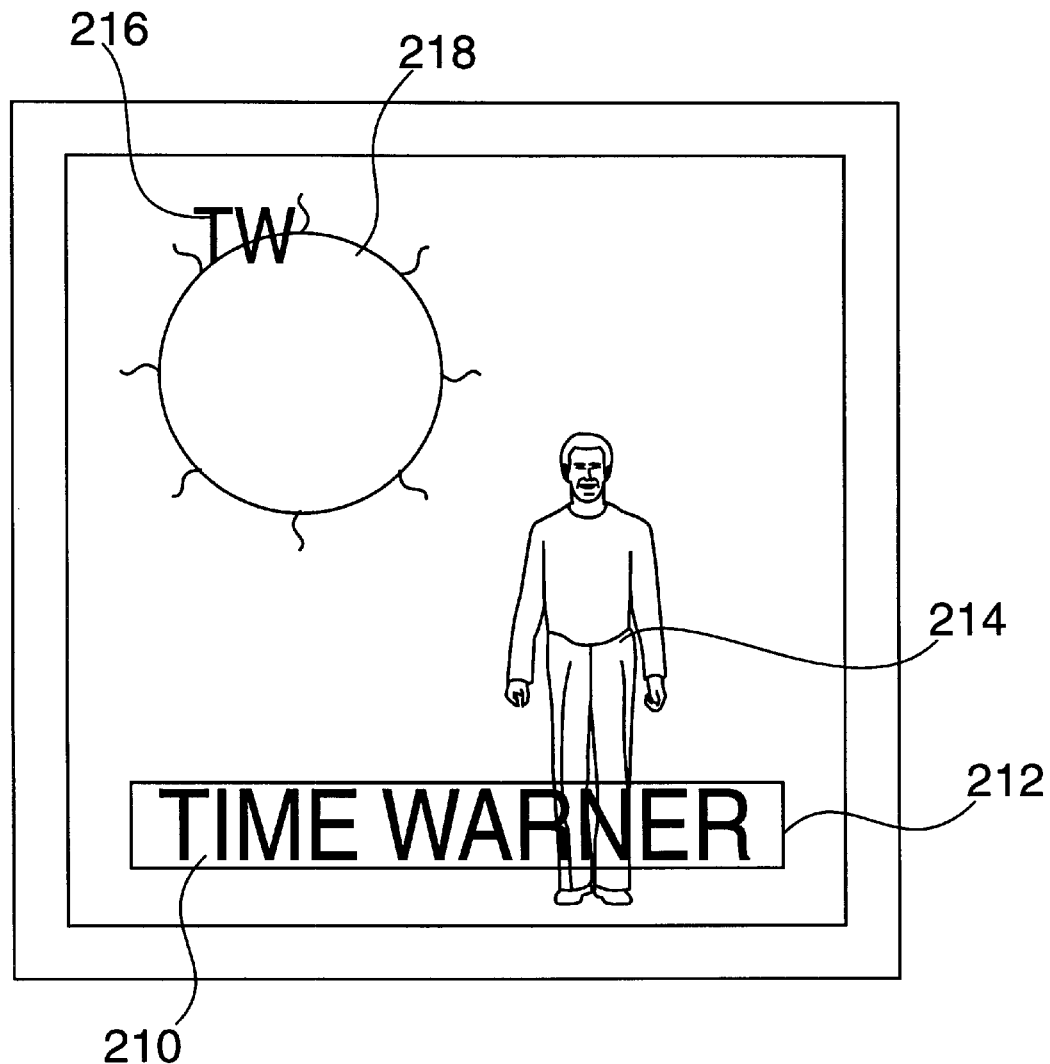
FIG. 2 shows the display portion of a playback device.

FIG. 2 shows the display portion of a playback device on which graphic data is superimposed on video data. In particular, text 210, text background 212 and image 216 are superimposed on the video data which included video images 214 and 218. Text background 212 can be a pale green color, for example. As can be seen from FIG. 2, text background 212 allows the part video image 214 not obscured by text 210 to been seen, while providing increased readability of text 210. In addition, image 216, which may be a corporate logo, for example, may be translucent in whole or in part, thereby allowing the viewer to see more of video image 218.

Most recording media 1 in use today provide for multiple sets of graphic data packets 116. Indeed, the DVD disc provides up to 32 such sets of graphic data packets 116. During playback of the recording media 1 on a playback device, the user of the playback device may select which, if any, of the multiple sets of graphic data packets 116 he wishes to have displayed. For example, subtitles can be provided in any number of languages, each stored in a separate set of data packets. Also, various different logos can be displayed as images 216.

Figure 3:
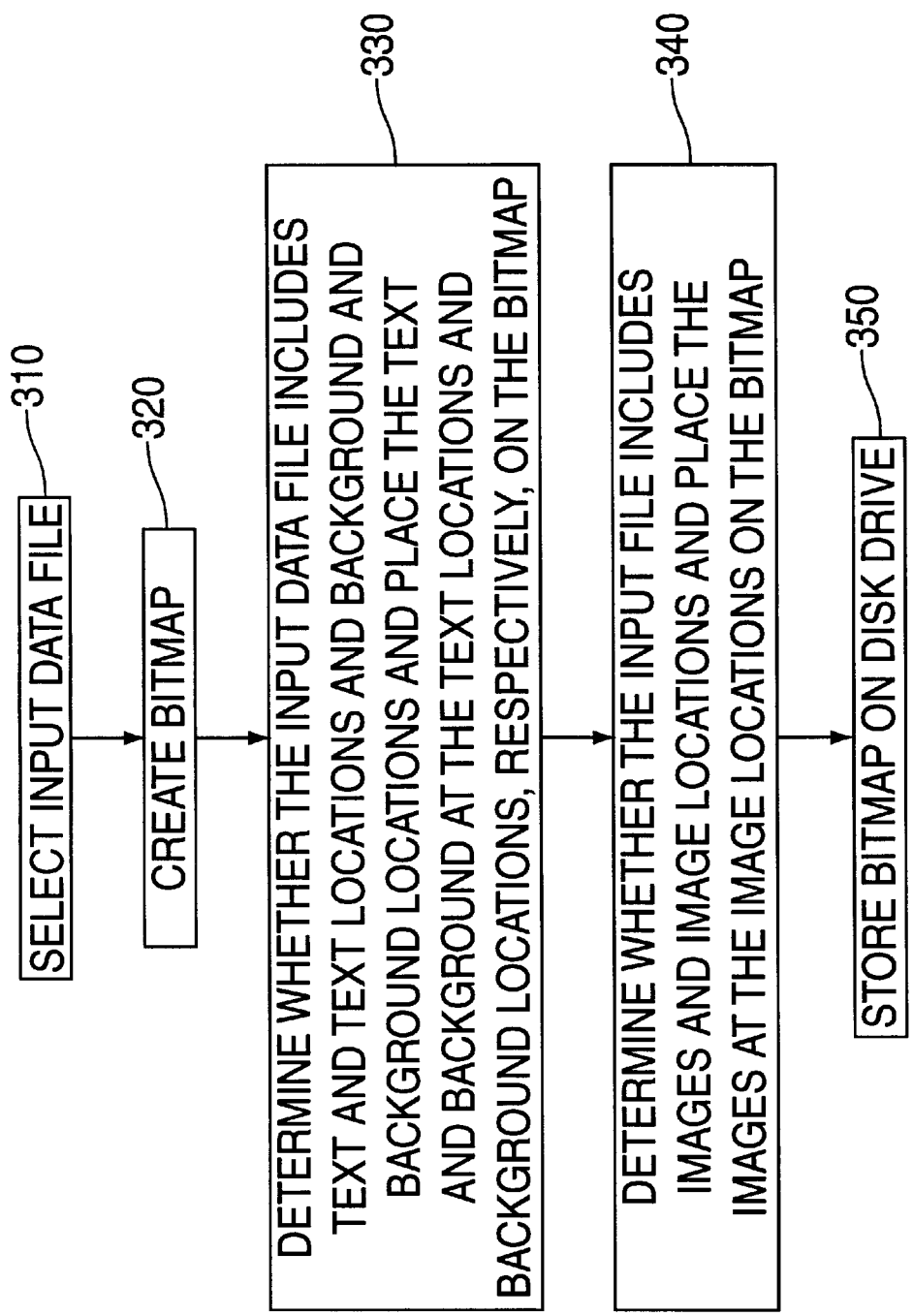
FIG. 3 is a flow chart with an exemplary embodiment of the method of the present invention.

FIG. 3 is a flow chart with an exemplary embodiment of the method of the present invention.

In step 310, an input data file is selected by the operator. If the graphic data is to include text, the input data file includes text, text location, background, background location, display times, text font and other text information. If the graphic data is to include images, the input data file includes the location of the binary image file, display time and other image information. The binary image file is stored as a separate file on the disk drive.

In step 320, a blank bitmap is created. Usually, the size of the blank bitmap corresponds to the size of the video data to be displayed.

In step 330, it is determined whether the input data file includes text and text locations, background and background locations. If the input data file includes text and text locations, background and background locations, the text and the background are placed at text locations and the background locations, respectively, on the bit map for an interval of time corresponding to the specified display time.

In step 340, it is determined whether the input data file includes an image and an image location. If the input data file includes an image and an image location, the image is placed at the image location on the bit map for an interval of time corresponding to the specified display time.

In step 350, the bitmap is saved on the computer's disk drive for importation into the recording medium 1.

As one skilled in the art will readily appreciate, steps 330–350 can be performed on a frame by frame basis for each frame in a sequence of frames. Also, one skilled in the art will readily appreciate that the steps need not be performed in the order indicated. For example, steps 330 and 340 may be performed in either order.

Figure 4:
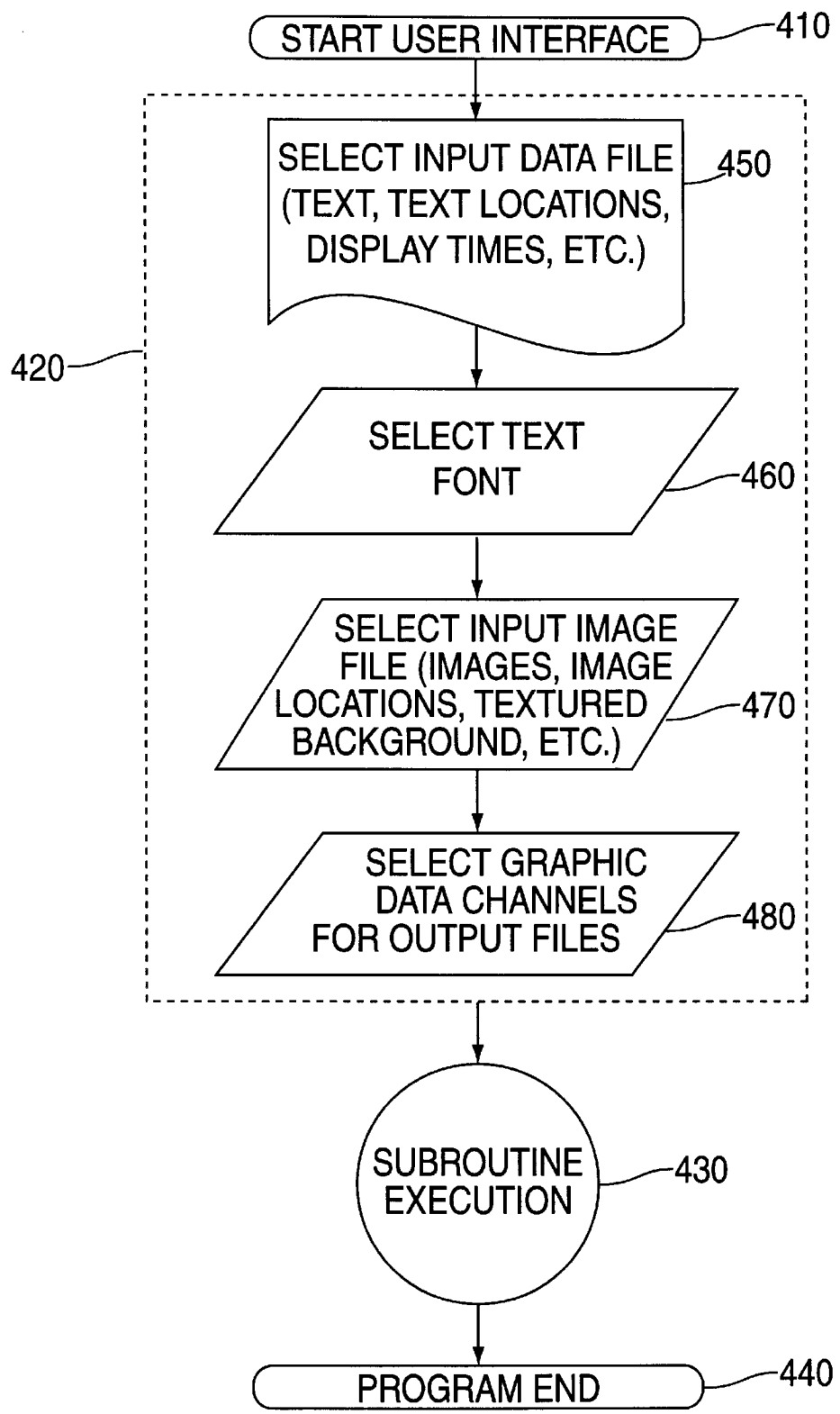
FIG. 4 shows another flow chart with a further exemplary embodiment of the method of the present invention.

FIG. 4 shows another flow chart with a further exemplary embodiment of the method of the present invention.

In step 410, the user interface is started. The user interface may comprise, for example, a menu-driven program for use on a computer.

Step 420 can be further divided in to several sub-steps. In sub-step 450, if the user desires to include text information in one of the sets of graphic data packets 116, the user selects an input data file which can include text, text placement, display times, etc. In sub-step 460, the user can select the text font. In step 470, if the user desires to include image information in one of sets of graphic data packets 116, the user can select an input image file which can include images, image locations, textured background, etc. In sub-step 480, the user can select one or more sets of graphic data packets 116 in which the output files (containing text and graphics) will be placed.

Step 430 is shown as a subroutine and will be discussed in relation to FIG. 5. In step 440, the program ends.

Figure 5:
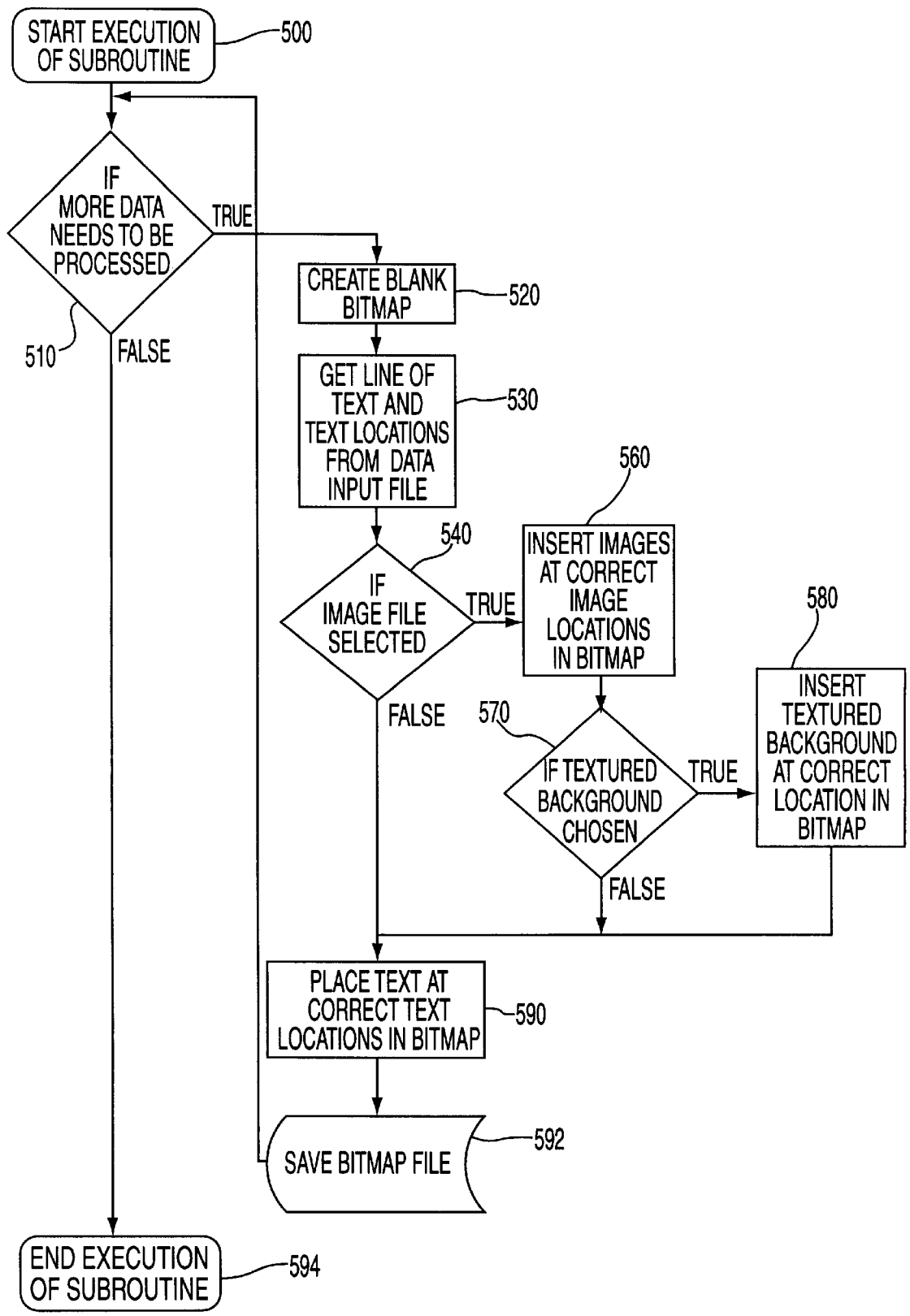
FIG. 5 shows another flow chart with further details of the exemplary embodiment of the method of the present invention shown in FIG. 4.

FIG. 5 shows another flow chart with further details of the exemplary embodiment of the method of the present invention shown in FIG. 4, in particular, step 430. It should be noted that one skilled in the art will readily appreciate the many possible divisions of the program into subroutines or sub-steps that are possible.

In step 500, the execution of the subroutine begins.

In step 510, the system examines the input data file selected in step 450 to determine if more data needs to be processed. If no more data needs to be processed, the system proceeds to step 594 to end execution of the subroutine. Otherwise, if more data needs to be processed the system continues to step 520.

In step 520, a blank bitmap is created. The bitmap corresponds in size to the video data to be displayed.

In step 530, a line of text and the associated text locations from the data input file are retrieved.

In step 540, the system determines if an image file has been selected. If an image file has been selected, the system proceeds to step 560, otherwise it proceeds to step 590.

In step 560, the images are placed at the image location on the bit map corresponding to the image location.

In step 570, the system determines if textured background is chosen. IF textured background has been chosen, the system proceeds to step 580, otherwise the system proceeds to step 590.

In step 580, textured background is inserted at the correct location in the bitmap.

In step 590, the text is placed at the text locations in the bitmap.

In step 592, the bitmap file is saved on the computer's disk drive for importation into the set (or sets) of graphic data packets selected in sub-step 480 and the system returns to step 510.

It should be noted that one skilled in the art will readily appreciate that the order of the steps (for example, steps 540 and 590) and sub-steps described above can be changed without affecting the operation of the invention.

Thus, it is seen that a recording medium including video, audio and graphics information stored in separate sets of data packets whereby the graphic information can be superimposed on the video information during playback of the recording media and the graphic information can include text or images and a method for creating the same is provided. One skilled in the art will appreciate that the present invention can be practiced by other than the described embodiments, which are presented for purposes of illustration and not of limitation, and the present invention is limited only by the claims which follow.

What is claimed is:

1. A recording medium comprising:
   a first set of data packets on which video data is recorded;
   a second set of data packets on which audio data is recorded; and
   a third set of data packets on which graphic data is recorded;
   wherein:
   said graphic data is superimposed on said video data during display, and
   said graphic data is selected from the group consisting of:
   text with a translucent background and an image, wherein said image is selected from the group consisting of an image translucent in whole and an image translucent in part.

2. The recording medium of claim 1 for use with a playback device wherein said graphic data recorded in said third set of data packets is selectively displayed by a user of said playback device.

3. The recording medium of claim 1 wherein said graphic data is stored in graphic data packets as a run-length compressed image file.

4. The recording medium of claim 1 wherein said first, second and third sets of data packets are segmented into a plurality of frames, whereby selected ones of said plurality of frames comprise video data, audio data and graphic data for reproduction during a set interval of time.

5. The recording medium of claim 4 wherein said set interval of time is selected from the group consisting of 1/24 second, 1/25 second and 1/30 second.

6. The recording medium of any one of claims 1 through 5 wherein said recording medium comprises a DVD disc.

7. The recording medium of any one of claims 1 through 5 wherein said translucent background is textured.

8. A method for generating graphic data for use in a recording medium comprising a first set of data packets on which video data is recorded, a second set of data packets on which audio data is recorded and a third set of data packets on which said graphic data is recorded, said method comprising the steps of:

selecting an input data file;

creating a blank bit map;

determining whether said input data file includes text and text locations, background and background locations and placing said text and said background at text locations and said background locations, respectively, on said bit map;

determining whether said input data file includes an image and an image location and placing said image at said image location on said bit map; and transferring said bit map to said third set of data packets.

9. The method of claim 8 wherein said transferring step comprises the sub-steps of:

storing said bit map in output files located in a computer including a disk drive; and placing said bit map stored in said output files onto said disk for importation onto said recording medium.

10. The method of claim 8 wherein said recording medium is for use with a playback device and said graphic data recorded in said third set of data packets is selectively displayed by a user of said playback device.

11. The method of claim 8 wherein said graphic data is stored in graphic data packets as a run-length compressed image file.

12. The method of claim 8 wherein said first, second and third sets of data packets are segmented into a plurality of frames, whereby selected ones of said plurality of frames comprise video data, audio data and graphic data for reproduction during a set interval of time.

13. The method of claim 12 wherein said set interval of time is selected from the group consisting of 1/24 second, 1/25 second and 1/30 second.

14. The method of any one of claims 11 through 13 wherein said recording medium comprises a DVD disc.

15. The method of any one of claims 11 through 13 wherein said translucent background is textured.

16. A DVD disc for use with a playback device by a user comprising:

a first set of data packets on which video data is recorded;

a second set of data packets on which audio data is recorded; and a third set of data packets on which graphic data is recorded;

wherein:

said graphic data is superimposed on said video data during display, said graphic data is selected from the group consisting of:

text with a translucent background and an image, wherein said image is selected from the group consisting of an image translucent in whole and an image translucent in part, said graphic data recorded in said third set of data packets is selectively displayed by said user of said playback device, said graphic data is stored in graphic data packets as a run-length compressed image file, and said first, second and third sets of data packets are segmented into a plurality of frames, whereby selected ones of said plurality of frames comprise video data, audio data and graphic data for reproduction during a set interval of time.

* * * * *